United States Patent [19]

Seko et al.

[11] Patent Number: 4,564,833
[45] Date of Patent: Jan. 14, 1986

[54] DOZING WARNING SYSTEM FOR A VEHICLE

[75] Inventors: Yasutoshi Seko, Yokohama; Takayuki Yanagishima, Yokosuka, both of Japan

[73] Assignee: Nissan Motor Company, Limited, Kanagawa, Japan

[21] Appl. No.: 377,206

[22] PCT Filed: Oct. 5, 1981

[86] PCT No.: PCT/JP81/00263

§ 371 Date: May 7, 1982

§ 102(e) Date: May 7, 1982

[87] PCT Pub. No.: WO82/01167

PCT Pub. Date: Apr. 15, 1982

[30] Foreign Application Priority Data

Oct. 6, 1980 [JP] Japan .................. 55-139660

[51] Int. Cl.$^4$ ............................................. G08B 21/00
[52] U.S. Cl. ..................................... 340/576; 180/272; 340/575
[58] Field of Search .................. 340/576, 575; 180/272

[56] References Cited

U.S. PATENT DOCUMENTS

| 3,106,981 | 10/1963 | Chakiris . | |
|---|---|---|---|
| 3,222,639 | 12/1965 | Kayser | 340/576 X |
| 3,227,998 | 1/1966 | Platt . | |
| 3,654,599 | 4/1972 | Sepper | 340/576 X |
| 3,794,969 | 2/1974 | Klopfenstein et al. . | |
| 3,877,541 | 4/1975 | Takeuchi et al. | 340/576 X |
| 3,938,612 | 2/1976 | Boudeville et al. . | |
| 3,980,999 | 9/1976 | Nishioka et al. | 340/52 R X |
| 4,005,398 | 1/1977 | Inoue et al. . | |
| 4,007,357 | 2/1977 | Yanagishima | 340/52 R X |
| 4,017,843 | 4/1977 | Yanagishima . | |
| 4,058,796 | 11/1977 | Oishi et al. . | |
| 4,104,621 | 8/1978 | Yanagishima et al. . | |
| 4,224,609 | 9/1980 | Yanagishima et al. . | |
| 4,278,969 | 7/1981 | Woods | 340/576 |
| 4,348,663 | 9/1982 | Yanagishima | 340/576 |

FOREIGN PATENT DOCUMENTS

| 059225 | 9/1982 | European Pat. Off. . |
|---|---|---|
| 2042853 | 3/1972 | Fed. Rep. of Germany . |
| 164530 | 6/1979 | Japan . |
| 121732 | 8/1980 | Japan . |
| 2225 | 1/1981 | Japan . |
| 2226 | 1/1981 | Japan . |
| 73638 | 6/1981 | Japan . |

Primary Examiner—James L. Rowland
Assistant Examiner—Brian R. Tumm
Attorney, Agent, or Firm—Lowe, King, Price & Becker

[57] ABSTRACT

A warning device for a vehicle includes a steering angle detector (10) producing steering angle pulses ($S_2$, $S_3$) indicative of the steering angle and the steering direction whenever the variation of the steering angular position exceeds a predetermined angle. A dozing detecting circuit (16) distinguishes that the driver is in a normal condition when excessively frequent steering operations in one direction are performed or when the interval of the steering angle pulse is longer than a predetermined value, and produces a warning signal when steering operations, each of which does not exceed the predetermined angle in one direction, are repeated at a rate greater than a predetermined frequency. A warning device (26) produces a visible or audible warning in response to the warning signal, whereby the warning device can accurately detect dozing of the driver and produce a warning to make the driver wake up.

15 Claims, 16 Drawing Figures

DOZING WARNING SYSTEM FOR A VEHICLE

FIELD OF THE INVENTION

The present invention relates generally to a warning system for detecting when a driver is dozing at the wheel and for producing a warning in response thereto. More particularly, the invention relates to a warning device which detects abnormal frequency of steering operations occurring when the driver dozes at the wheel of an automotive vehicle.

BACKGROUND OF THE INVENTION

With regard to automotive vehicles, certain driving operations different from those of normal driving occur when the driver dozes. For example, with a dozing driver, certain abnormal operations, such as maintaining a steering frequency at a significantly low level or providing no steering operation for a certain period of time and thereafter abrupt steering, may be performed. Normally, due to inattention of the dozing driver, steering frequency is unnecessarily increased. Therefore, if specific steering operations apt to occur during a condition wherein a driver is dozing at the wheel can be detected, it is possible to detect when the driver is dozing at the wheel. By accurately detecting dozing of the driver, an appropriate warning can be given to awaken the driver from the dozing state.

On the other hand, even under normal driving conditions, it is occasionally necessary to steer similarly to the specific operations occurring during dozing at the wheel, depending on road conditions. Therefore, there is some possibility of producing a warning erroneously due to improper recognition of dozing. For example, when the vehicle passes from a straight road to a relatively narrow curved road, the steering operation frequency will be relatively low while driving on the straight stretch and thereafter steering operations of relatively high frequency and amplitude will be performed while on the curved road. Thus, if recognition is based on the condition that steering frequency less than a predetermined frequency is maintained for more than a predetermined time period and thereafter abrupt steering is performed, the warning will be given in the above driving condition even through the driver is in a normal conscious state. Therefore, for detecting dozing of the driver, it is quite important to select warning conditions which are quite specific to the dozing state.

Therefore, it is an object of the present invention to provide a doze warning system for a vehicle by detecting an abnormally high frequency of steering operation under a dozing condition of the driver in order to give a warning to the driver.

The above-mentioned and other objects are accomplished by a warning system for vehicle according to the present invention, which detects the frequency of steering operation within a unit time and produces a warning when the detected steering operation frequency exceeds a predetermined frequency which is preset to a frequency higher than that performed during normal driving. Furthermore, according to the present invention, if steering operations in the same direction are performed at an excessive frequency or if an interval between steering operations is longer than a given interval, the discrimination that the vehicle driver is steering through a curve will be made to prevent the device from producing the warning.

According to the preferred embodiment of the invention, the doze warning system for the vehicle comprises steering angle detecting means for detecting steering angle and steering direction and for producing a signal representative of detected steering angle and steering direction, a dozing detecting circuit for counting the occurrences of steering within a predetermined period, for clearing the counted value when the signal value indicative of a constant steering direction exceeds a given value or the frequency of the signal is lower than a predetermined value, and for producing a warning signal when the counted value exceeds a predetermined threshold value, and warning means for producing the warning in response to the warning signal.

DESCRIPTION OF THE PREFERRED EMBODIMENTS

Figure 1:
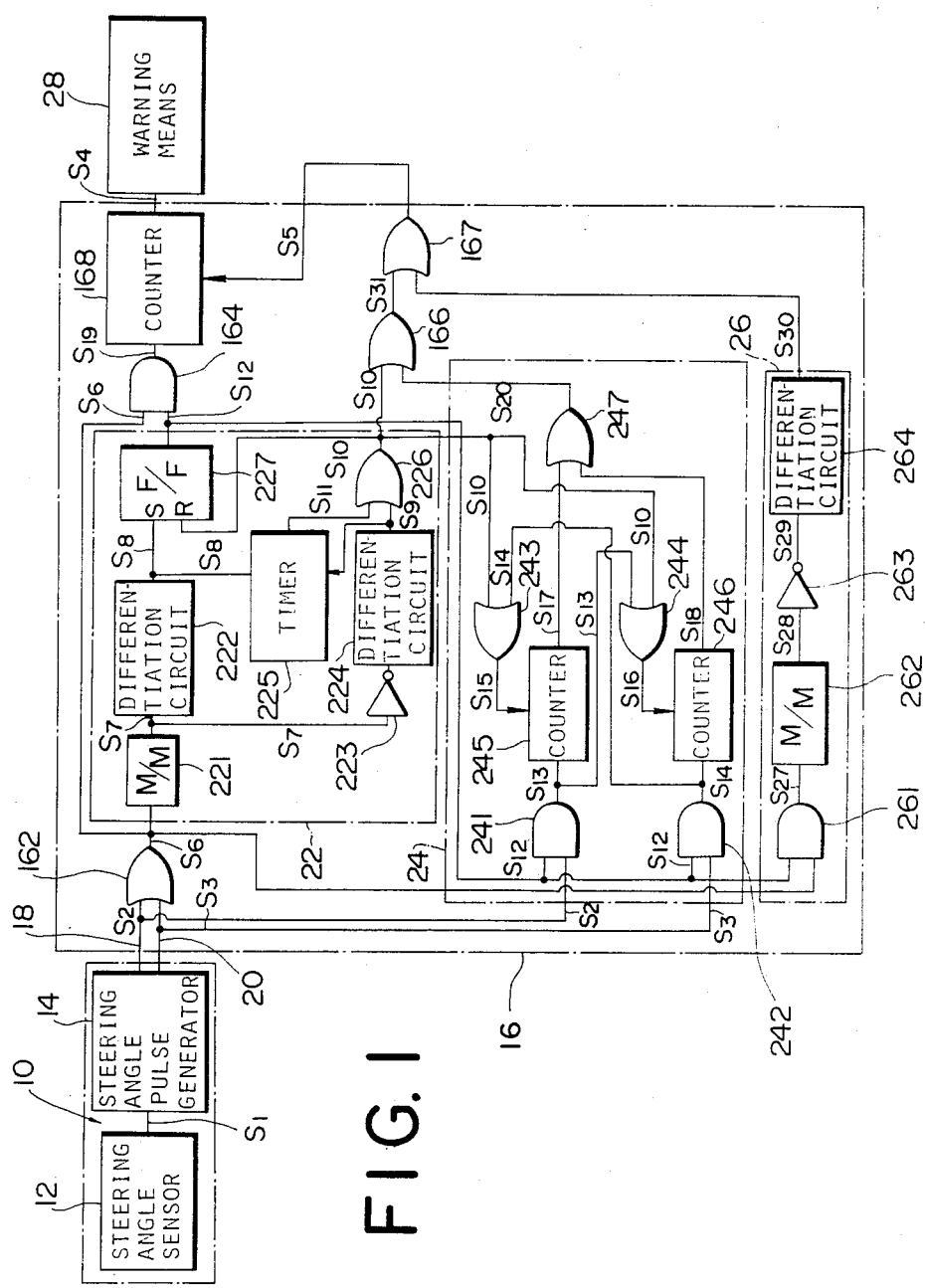
FIG. 1 is a block diagram of a first embodiment of a warning device according to the present invention.
Figure 2:
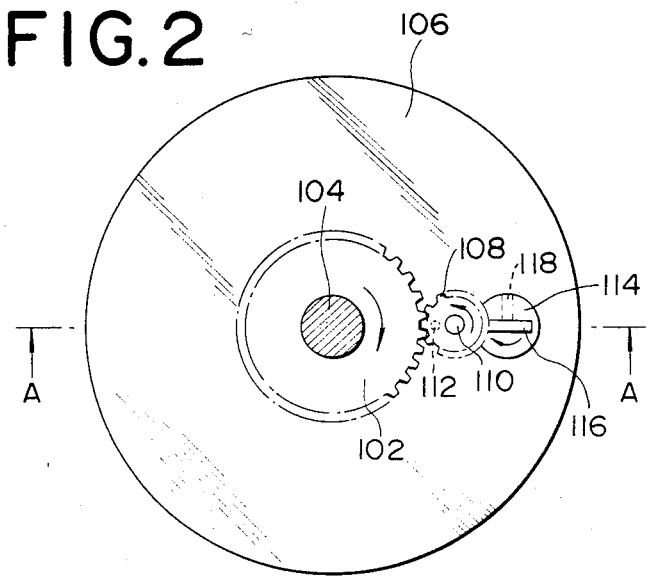
FIG. 2 is a plan view showing a steering angle sensor employed by the warning device of FIG. 1.
Figure 3:
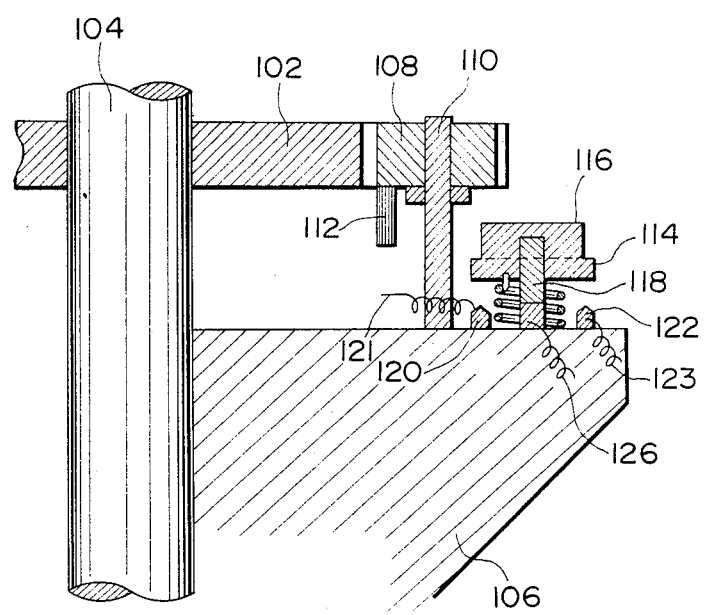
FIG. 3 is a section taken along line A—A of FIG. 2.
Figure 4:
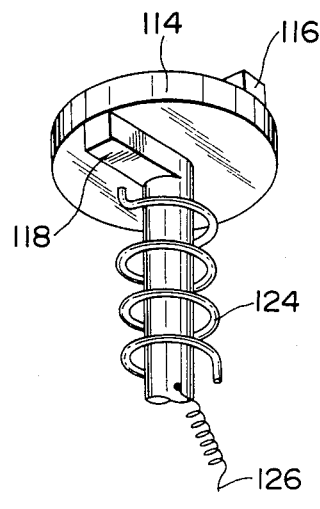
FIG. 4 is a perspective view of part of the steering angle sensor of FIG. 2, viewed from an angle revealing the movable contact thereof.
Figure 5:
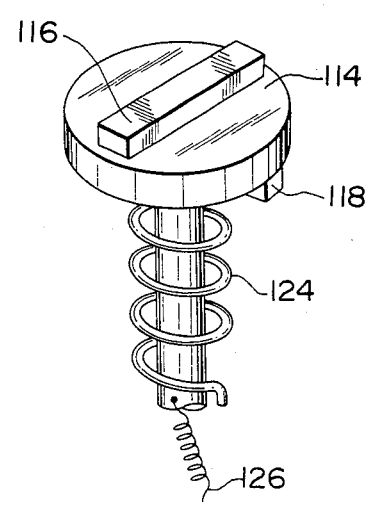
FIG. 5 is a perspective view of part of the steering angle sensor of FIG. 2, viewed from an angle revealing the upper surface thereof.

The preferred embodiments of the present invention will be described hereinafter with reference to the attached drawings. FIG. 1 shows the first embodiment of a warning system according to the present invention. The steering angle of the vehicle is detected by a steering angle sensor 12. The steering angle sensor produces a steering angle signal $S_1$ representative of the steering angle and steering direction. The steering angle signal $S_1$ is inputted to a steering angle pulse generating circuit 14. The steering angle pulse generating circuit 14 constitute a steering angle detector 10 in conjunction with the steering angle sensor 12. The steering angle pulse generator 14 produces steering angle pulses $S_2$ and $S_3$, respectively representative of different steering direction, in response to a predetermined steering angle change. In the preferred embodiment, the steering angle pulse generating circuit 14 produces a steering angle pulse $S_2$ for every 5 degrees of counterclockwise steering change and a steering angle pulse $S_3$ for every 5 degrees of clockwise steering change.

The steering angle pulse generating circuit 14 is connected to the dozing detecting circuit 16 via leads 18 and 20. The steering angle pulse $S_2$ is fed to the dozing detecting circuit 16 via the lead 18 and the steering angle pulse $S_3$ is fed to the dozing detection circuit via the lead 20. The dozing detecting circuit 16 comprises a warning signal generating section 22 and a control section 24 for controlling operation of the warning signal generating section 22. The warning signal generating section 22 counts the steering angle pulses inputted thereto within a predetermined period of time and produces a warning signal $S_4$ when the counted value exceeds a predetermined threshold value. The control section 24 counts the pulses of either steering angle signal $S_2$ or $S_3$ sequentially inputted thereto and produces a reset signal $S_5$ when the counted value thereof exceeds a predetermined value in order to clear the counted value of the warning signal generating section 22. The control section 24 clears its own counted value in response to a pulse from the steering angle signal $S_3$ or $S_2$ other than the one being counted. On the other hand, intervals between inputs of the steering angle signal $S_2$ and $S_3$ are measured by a pulse interval detecting circuit 26. The pulse interval detecting circuit 26 produces a signal $S_{30}$ when the interval between inputs of the steering angle pulse $S_2$ and $S_3$ is longer than a predetermined interval, to clear the counter value of the warning signal generating section 22. Therefore, the warning signal generating section 22 produces a warning signal $S_4$ when steering is performed in opposite directions at more than a predetermined frequency. A warning means 28 is driven in response to the warning signal $S_4$. The warning means 28 produces any warning which can wake the driver, for example a buzzer, a warning voice, discharging cold air into the driver's face, a display, a lamp and so on just as long as an appropriate device for producing the selected warning is employed as the warning device.

Figure 6:
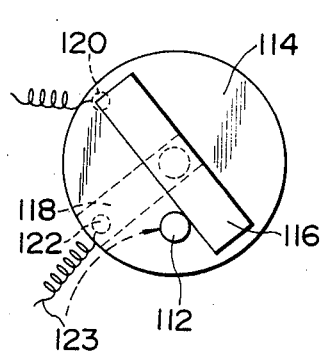
FIG. 6 is a plan view of the steering angle sensor rotated toward clockwise direction.
Figure 7:
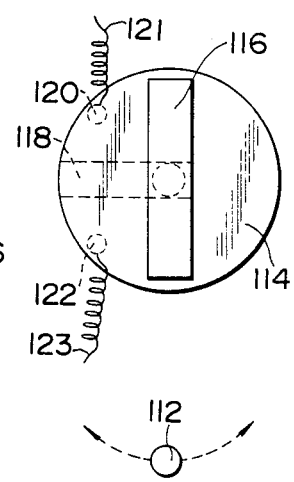
FIG. 7 is a plan view similar to FIG. 6 and showing the steering angle sensor at a neutral position.

FIGS. 2 to 9 show the detail of the steering angle detector in the first embodiment. A first gear 102 is fixed at its center portion to a steering column shaft 104 so as to rotate together with the steering column shaft 104 and a column tube 106. A second gear 108 engages the first gear 102. The second gear 108 is rotatably supported by a shaft 110 fixed at its bottom end to the column tube 106. In this embodiment, the second gear 108 is adapted to one cycle while the first gear rotates at a predetermined angle, e.g., 1° so that, when the first gear 102 rotates once, the second gear 108 rotates three times. The second gear 108 has a first member 112 extending downwards from the bottom of the second gear 108 and positioned near the periphery thereof. A second member 114 of disc-shaped configuration has a strip-like projection 116 on the upper surface of second member 114. The lower end of the first member 112 is positioned in such a way that, when the first member 112 moves in response to the rotation of the second gear 108, it can push the projection 116 together with the second member 114 so that the second member 114 will rotate through a predetermined angle. The second member 114 has a strip-like movable contact 118 on the lower side thereof adapted to contact one of a pair of a stationary contacts 120 and 122 when the second member 114 rotates to either of two given positions. Those stationary contacts 120 and 122 are attached to the top of the column tube 106. The second member 114 is biased by a coil spring 124 so as to be normally held in a neutral position as shown in FIG. 7, where the movable contact 118 is centered between the stationary contacts 120 and 122. The movable contact 118 is connected through a lead wire 126 to a power source (not shown). The stationary contacts 120 and 122 are connected through lead wires 121 and 123 to the steering angle pulse generating circuit 14 of FIG. 1.

Figure 8:
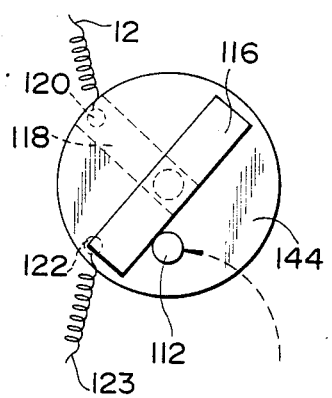
FIG. 8 is a plan view similar to FIG. 6 and showing the steering angle sensor rotated counterclockwise.

The operation of the above-mentioned steering angle detector will be described hereafter. When the steering wheel (not shown) rotates clockwise, the steering column shaft 104 rotates clockwise together with the first gear 102 whereby the first member 112 rotates counterclockwise together with the second gear 108. Thus, the first member 112 thereby comes to contact with the projection 116 of the second member 114 due to this counterclockwise rotation. Thus, the second member 114 is rotated clockwise by the pushing force of the first member 112 of the second gear 108 against the biasing force of the spring 124 so that the movable contact 118 thereof comes into engagement with the stationary contact 120 as shown in FIG. 8. As the second gear 108 rotates further counterclockwise, the projection 116 of the second member 114 separates from the first member 112. As a result, the second member 114 rotates to return to its neutral position due to the biasing force of the spring 124. On the other hand, when the first gear 102 rotates counterclockwise, the second gear 108 rotates clockwise together with the first member 112 whereby the first member 112 comes into engagement with the projection 116 of the second member 114. The clockwise movement of the first member 112 urges the second member 114 to rotate counterclockwise so that the movable contact 118 of the second member 114 comes into contact with the stationary contact 122 as shown in FIG. 6. When the second gear 108 rotates further in the same direction, the projection 116 of the second member 114 separates from the first member 112 so that the second member 114 rotates to return to its neutral position as shown in FIG. 7.

When the movable contact 118 engages either of the stationary contacts 120 and 122, a pulse is sent to the steering pulse generating circuit 14.

Figure 9:
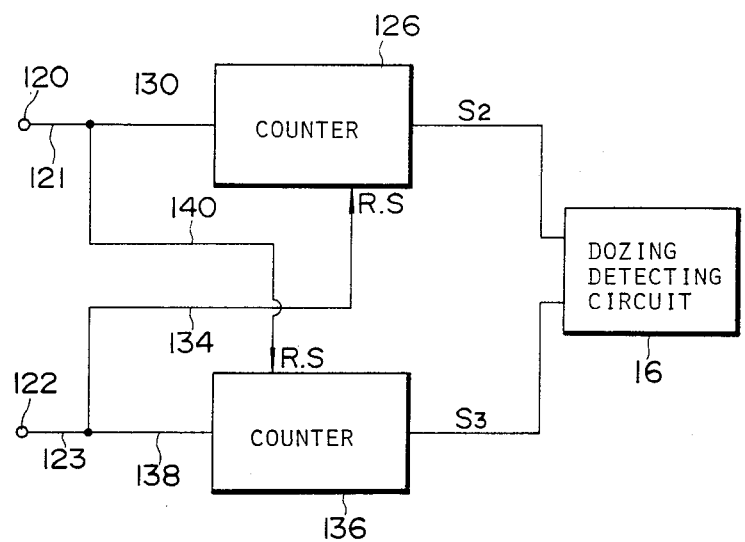
FIG. 9 is a schematic block diagram of the steering angle pulse generator of FIG. 1.

FIG. 9 schematically illustrates an example of the steering angle pulse generating circuit 14. A first counter 126 is connected through the lead wires 121 and 130 to the stationary contact 120 and through the lead wires 123, 134 to the contact 122. The second counter 136 is also connected to the contacts 120 and 122 via leads 121, 140 and 123, 138, respectively, and counts the number of clockwise rotations of the first member 112 upon receipt of signals from the lead wire 138. When the steering wheel begins to rotate in the opposite direction the second counter 136 is reset upon receipt of a signal from the lead wire 140. The first counter 126 counts the number of rotations of the first member 112 upon receipt of signals from the lead wire 130. When the steering wheel begins to rotate in the other direction, the first counter 126 is reset upon receipt of a signal from lead wire 134.

The first and second counters 126 and 136 produce steering angle pulse signals $S_2$ and $S_3$ respectively when the counted value reaches a predetermined value corresponding to a 5 degree change in steering angle.

Figure 10:
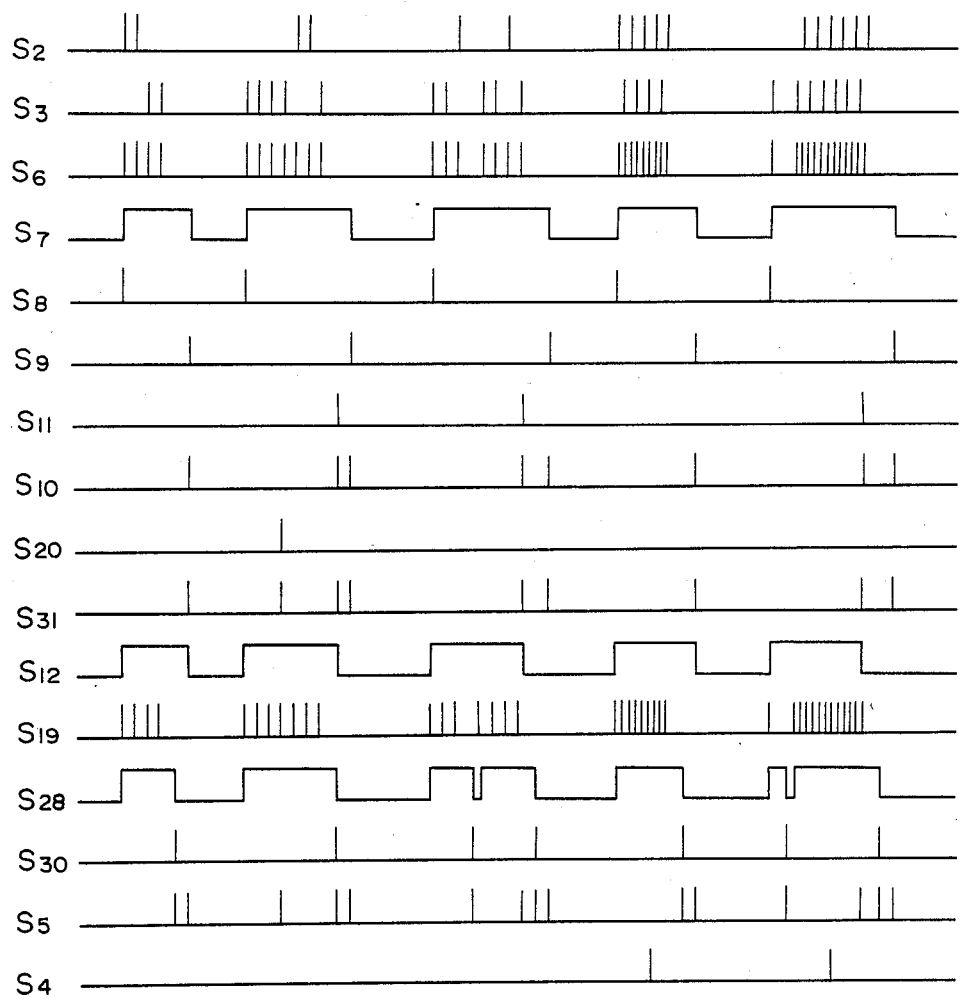
FIG. 10 is a timing chart for the warning device of FIG. 1.

Next, details of the dozing detecting circuit 16 will be described with reference to FIGS. 1 and 10. The steering angle pulses $S_2$ and $S_3$ produced by the steering angle pulse generating circuit 14 are inputted to an OR gate 162 of the dozing detecting circuit 16 via lead wires 20 and 18. The OR gate 162 is responsive to either steering angle pulse $S_2$ and $S_3$ to turn ON to produce an output $S_6$. The output $S_6$ of the OR gate 162 is inputted to a monostable multivibrator 221 of the warning signal generating section 22. The monostable multivibrator 221 is responsive to the output $S_6$ of the OR gate 162 to turn on for a predetermined period, for example, 5 sec., to produce an output $S_7$. The output $S_7$ of the monostable multivibrator 221 is fed to a differentiation circuit 222. The differentiation circuit 222 detects the rising edge of the monostable multivibrator output $S_7$ to produce an output pulse $S_8$. Additionally, the output $S_7$ of the monostable multivibrator 221 is inverted by an inverter 223 and then inputted to a differentiation circuit 224. The differentiation circuit 224 thus detects the trailing edge of the monostable multivibrator output $S_7$ to produce an output signal $S_9$.

A timer 225 is responsive to the differentiation circuit output $S_8$ to start measuring time and produces an output $S_{11}$ a predetermined period, e.g., 15 sec., after receiving the pulse $S_8$. The output $S_9$ of the differentiation circuit 224 serves as reset signal for the timer 225.

The differentiation circuit 222 is connected to the set input S of a flip-flop 227 to set the latter with the output $S_8$. The reset input R of the flip-flop 227 is connected to an OR gate 226. The OR gate 226 produces an output $S_{10}$ in response to pulses from either the differentiation circuit output $S_9$ or timer outputs $S_{11}$. The output $S_{10}$ of the OR gate 226 serves as reset signal for the flip-flop 227. The flip-flop 227 produces a high-level output $S_{12}$ while it is in the set state.

The output terminal of the flip-flop 227 is connected to one of the input terminals of each of two AND gates 241 and 242 of the control section 24 which controls the warning signal generating section 22. The other input terminals of the AND gates 241 and 242 are respectively connected to the leads 18 and 20 of the steering angle pulse generating circuit 14. The AND gates 241 and 242 are responsive to the steering angle pulses $S_2$ and $S_3$ to produce outputs $S_{13}$ and $S_{14}$ respectively, under the condition that the output $S_{12}$ of the flip-flop 227 is high. A counter 245 is connected to the AND gate 241 to count the pulses of AND gate output $S_{13}$ produced in response to the steering angle pulse $S_2$. A counter 246 is connected to the AND gate 242 to count the pulses of the AND gate output $S_{14}$ produced in response to the steering angle pulse $S_3$. The counters 245 and 246 are both connected to an OR gate 226 of the warning signal generating section 22 via respective OR gates 243 and 244. The OR gate 243 is also connected to the output terminal of the AND gate 242. The OR gate 243 produces an output $S_{15}$ in response to either the output $S_{10}$ of the OR gate 226 or the output $S_{14}$ of the AND gate 242. The output $S_{15}$ of the OR gate 243 serves as a reset signal for the counter 245 to clear the counter value. The OR gate 244 is connected to the output terminal of the AND gate 241. The OR gate 244 produces an output $S_{16}$ in response to either the output $S_{10}$ of the OR gate 226 or the output $S_{13}$ of the AND gate 241. The output $S_{16}$ of the OR gate 244 is inputted to the counter 246 to clear the counter value thereof. The counters 245 and 246 produce respective outputs $S_{17}$ and $S_{18}$ when their counter values reach predetermined values.

On the other hand, one input terminal of an AND gate 261 of the pulse interval detecting circuit 26 is connected to the OR gate 162 and the other input terminal is connected to the output terminal of the flip-flop 227. The AND gate produces an output $S_{27}$ when an AND condition of the flip-flop output $S_{12}$ and the output $S_6$ of the OR gate 162 is established. The output $S_{27}$ of the AND gate 261 is inputted to a monostable multivibrator 262 to turn the latter on for a predetermined period of time, e.g. 3 sec. The output $S_{28}$ of the monostable multivibrator 262 is inputted to a differentiation circuit 264 via an inverter 263 which inverts the monostable multivibrator output. The differentiation circuit 264 is responsive to an inverter output $S_{29}$ responsive to the trailing edge of the output $S_{28}$ of the monostable multivibrator 262, to produce an output $S_{30}$.

The output $S_{12}$ of the flip-flop 227 is inputted to the AND gate 164. The AND gate 164 is responsive to the output $S_6$ of the OR gate 162 under the condition that the output $S_{12}$ is high, to produce an output $S_{19}$. The output $S_{19}$ of the AND gate 164 is inputted to the counter 168. The reset terminal of the counter 168 is connected to the output terminal of the OR gate 166. One of the input terminals of the OR gate 166 is connected to the output terminal of the OR gate 226 and the other input terminal thereof is connected to the output terminal of the OR gate 247. The OR gate 247 is turned on to produce an output $S_{20}$ in response to either of outputs $S_{17}$ or $S_{18}$ of the counters 245 and 246 respectively. The OR gate 166 produces a reset signal $S_5$ in response to either the output $S_{10}$ of the OR gate 226 or the output $S_{20}$ of the OR gate 247. The counter 168 is responsive to the reset signal $S_5$ to clear the counter value.

The counter 168 produces a warning signal $S_4$ to be fed to the warning means 28 of FIG. 1 when the counter value thereof reaches a predetermined value. The counter 168 clears its counter value at the same time it produces the warning signal $S_4$.

Figure 11:
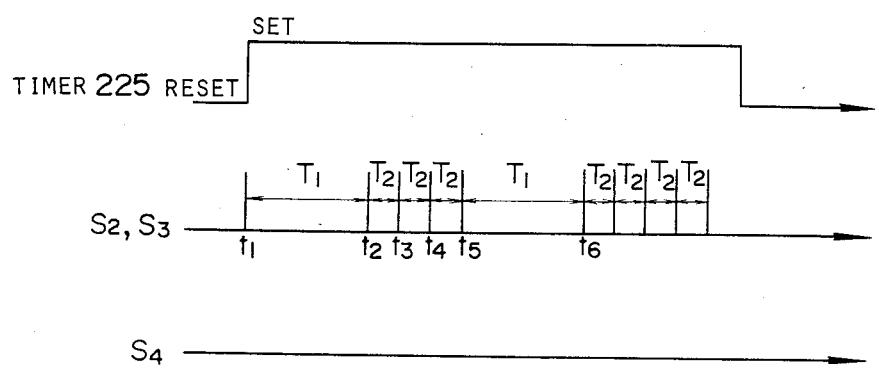
FIGS. 11 and 12 are timing charts showing operation of a pulse width detecting circuit of FIG. 1.
Figure 12:
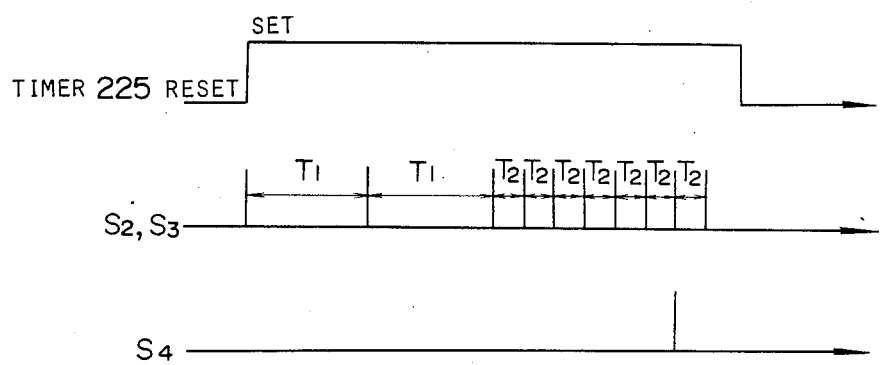

In the above construction, the operation will be described with reference to the timing chart of FIG. 10. When right hand steering pulse $S_2$ or left hand steering pulse $S_3$ is outputted from the steering angle pulse generator 14, the OR gate 162 outputs the pulse signal $S_6$. The monostable multivibrator 221 is responsive to pulses of the signal $S_6$ to turn on for the predetermined period, for example, 5 sec. If the next pulse signal $S_6$ is inputted during the period in which the monostable multivibrator is kept ON, the period is prolonged. Therefore, absence of the output of the monostable multivibrator 221 indicates that the pulse signal $S_6$ has not been produced for at least 5 sec. The rising edge of the output of the monostable multivibrator 221 is detected by the differentiation circuit 222. The differentiation circuit 222 produces the output $S_8$ each time it detects a rising edge of the monostable multivibrator output. In addition, the output of the monostable multivibrator 221 is inputted to the differentiation circuit 224 via the inverter 223. The differentiation circuit 224 detects the falling edge of the output $S_7$ to produce the output $S_9$. The flip-flop 227 is set by the output $S_8$ of the differentiation circuit 222 to output a high-level signal $S_{12}$. At the same time, the timer 225 turns ON in response to the output $S_8$ of the differentiation circuit 222 and outputs the signal $S_{11}$ when a preset time period, e.g., 15 sec. expires. The flip-flop 227 is reset by the output $S_{10}$ of the OR gate 226. The flip-flop 227 feeds a signal having value "1" to the AND gate 164 until it is reset. The counter 168 counts the output pulses $S_{19}$ of the AND gate 164 to count the occurrence of the steering angle pulses $S_2$ and $S_3$. The counter 168 produces the warning signal $S_4$ when the counter value reaches a predetermined value, e.g., 7. On the other hand, while the flip-flop 227 is maintained at ON position, the AND gates 241 and 242 conduct the right-hand and left-hand steering angle pulses $S_2$ and $S_3$. The counters 245 and 246 count respective steering angle pulses $S_2$ and $S_3$. Respective counters 245 and 246 feed the reset signal $S_5$ to the counter 168 via the OR gate 247 and the OR gate 166 when either counter value reaches the predetermined value, e.g., 4. In the foregoing embodiment, the steering operation in a constant direction, for example, driving through a curve, the counter value of the counter 168 is reset by the reset signal $S_5$ and thus the warning signal will not be produced. In other words, when alternating-direction steering operations which produce less than 4 sequential right-hand or left-hand steering angle pulse $S_2$ and $S_3$, are effected and when the counted value of the steering angle pulses $S_2$ and $S_3$ reaches 7, the warning means 26 produces a warning. As shown in FIGS. 11 and 12, the output $S_{28}$ of the monostable multivibrator 262 of the pulse interval detecting circut 26 is maintained for 3 sec. and renewed by following steering angle signal $S_2$ and $S_3$ as inputted. In the experimentation of FIGS. 11 and 12, period $T_1$ is longer than 3 sec., $T_2$ is shorter than 3 sec. The differentiation circuit 264, therefore, produces the output $S_{30}$ by detecting the trailing edge of the output $S_{28}$ of the monostable multivibrator 262 upon expiring 3 sec. from the output $S_{27}$ of the AND gate 261 being generated. As shown in FIG. 11, assuming the steering angle pulse $S_2$ and $S_3$ are inputted at time points $t_2$, $t_3$, $t_4$ and $t_5$ at an interval $T_2$ and thereafter at time point $t_6$ at an interval $T_1$, the differentiation circuit 264 produces the output $S_{30}$ 3 sec. after the time point $t_5$. In response to the output $S_{30}$ of the differentiation circuit 264, a reset signal $S_5$ is produced in the OR gate 167 and inputted to the counter 168. The counter 168 is cleared by the reset signal $S_5$.

As described above, according to the present invention, when the steering angle pulse $S_2$ or $S_3$ representative of the same steering direction are inputted exceeding a predetermined value, or the input interval of the steering angle pulse $S_2$ and $S_3$ is longer than a predetermined interval, the counted value in the counter 168 is cleared. Therefore, the warning signal $S_4$ will not be produced.

Figure 13:
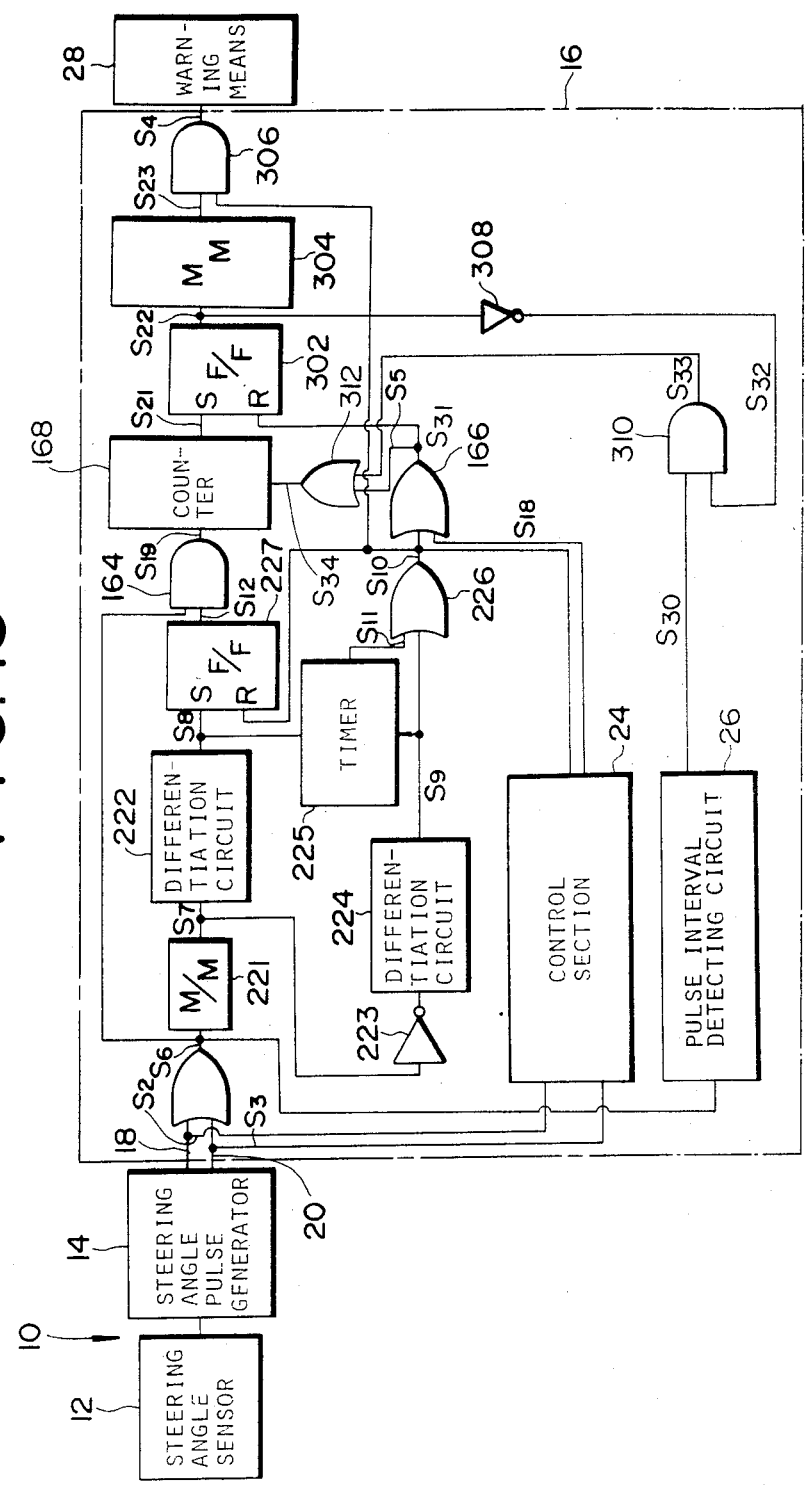
FIG. 13 is a block diagram of a second embodiment of the warning device of the present invention.

Referring to FIG. 13, there is illustrated the second embodiment of the present invention, in which the warning means is not instantly responsive to the warning signal $S_{12}$. In this embodiment, the warning signal $S_{12}$ is held for a predetermined time period and the warning means produces the warning after expiration of the foregoing time period and only if the signal indicative of steering through a curve is not inputted during that predetermined period. Elements analogous to those of the foregoing first embodiment are represented by the same reference numerals and thus further explanation therefor is neglected in the description given hereinbelow. In addition to the first embodiment, a flip-flop 302 which can be set by a first warning signal $S_{21}$ and reset by the output of the OR gate 166, a monostable multivibrator 304 detecting the falling edge of the output of the flip-flop and turning on for a predetermined time period after detecting the falling edge of the flip-flop output, and an AND gate 306, receiving inputs from the monostable multivibrator 304 and the OR gate 226, which produces an output to be fed to the warning means 26. On the other hand, the output terminal of the flip-flop 302 is connected to an AND gate 310 via an inverter 308. The AND gate 310 is, in turn, connected to the differentiation circuit 264 of the pulse interval detecting circuit 26. The AND gate 310 is responsive to the output of the differentiation circuit 264 in presence of an output $S_{32}$ which is produced by the inverter 308 while the flip-flop 302 is turned off. The OR gate 312 connected to the reset terminal of the counter 168 is inputted outputs $S_{33}$ and $S_{31}$ of the AND gate 310 and the OR gate 166 and the counted value of the counter 168 is cleared by the output $S_{34}$ of the OR gate 312.

Figure 14:
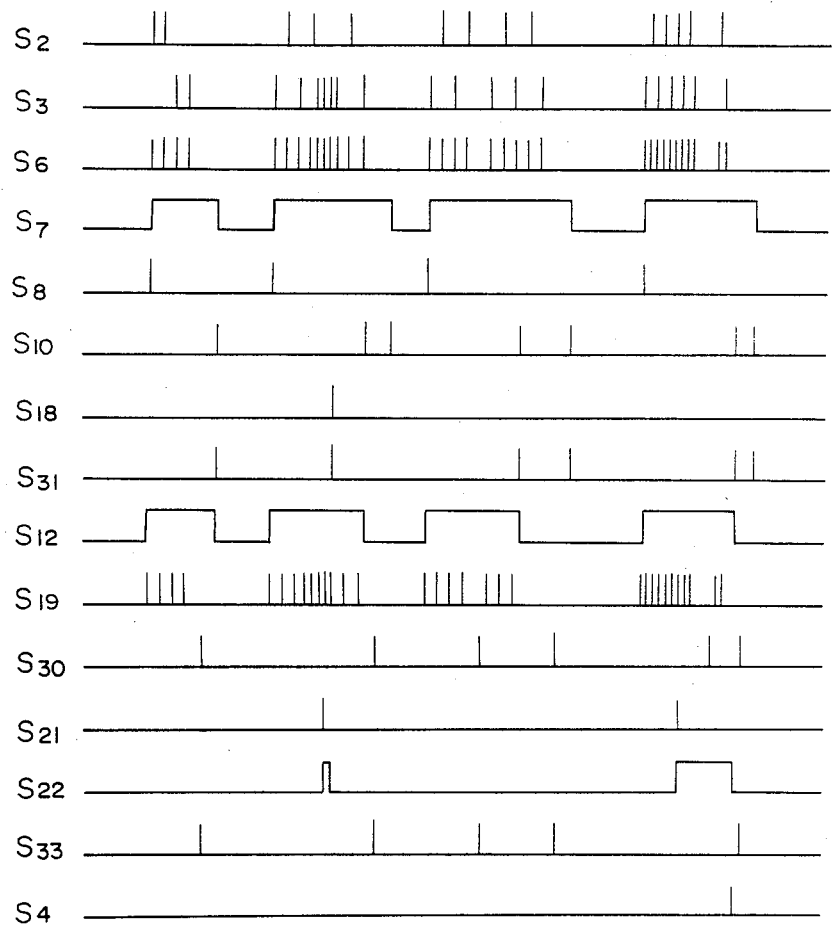
FIG. 14 is a timing chart for the warning device of FIG. 13.

In the above-illustrated construction, the operation will be described with reference to the timing chart of FIG. 14. When the first warning signal of the counter 168 is outputted, flip-flop 302 is turned on to produce the signal $S_{22}$. The flip-flop 302 is resetted in response to the output $S_5$ of the OR gate 226 indicative of expiration of the measuring period for measuring the steering frequency and monostable multivibrator 304 is turned on in response to the trailing edge of the flip-flop output to produce the output $S_{23}$. Therefore, if the reset signal $S_5$ is produced in the control section 24 while the steering frequency is measured, the flip-flop 302 is reset and thus AND gate 306 will not produce the second warning signal $S_4$. The AND gate 306 produces the warning signal $S_4$ to produce warning in the warning device 28 only when the reset signal $S_5$ is not outputted In the above construction, the function will be described with reference to the timing chart of FIG. 12. When the first warning signal $S_{21}$ is outputted from the counter 168, the flip-flop 302 is turned on to produce a signal $S_{22}$. At the time the level of the flip-flop 302 output $S_{22}$ drops in response to the output $S_5$ of the OR gate 226, which is indicative of expiration of counting time, the monostable multivibrator 304 is turned ON for the predetermined time period to produce an output $S_{23}$. Therefore, when the reset signal $S_5$ is outputted from the control section 24 during the steering pulse counting period, the AND gate 306 is prevented from producing the second warning signal $S_4$. Thus, only when the reset signal $S_5$ is not produced will the warning signal $S_4$ be fed to the warning means 18.

Figure 15:
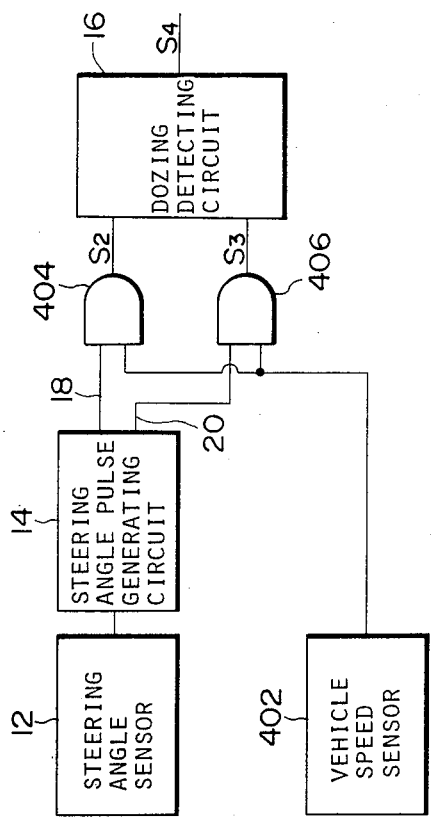
FIG. 15 is a block diagram of a third embodiment of the warning device of the present invention.

FIG. 15 shows the third embodiment of the present invention. In this embodiment, a vehicle speed sensor 402 for producing an output "1" when the vehicle speed is higher than a preset speed and AND gates 404 and 406 permitting the steering angle pulses $S_2$ and $S_3$ from the steering angle pulse generator to pass therethrough under the condition that the output of the vehicle speed sensor 402 is high are added to the foregoing first embodiment. Thus, warning will not be created while driving through a city or at a relatively low speed.

Figure 16:
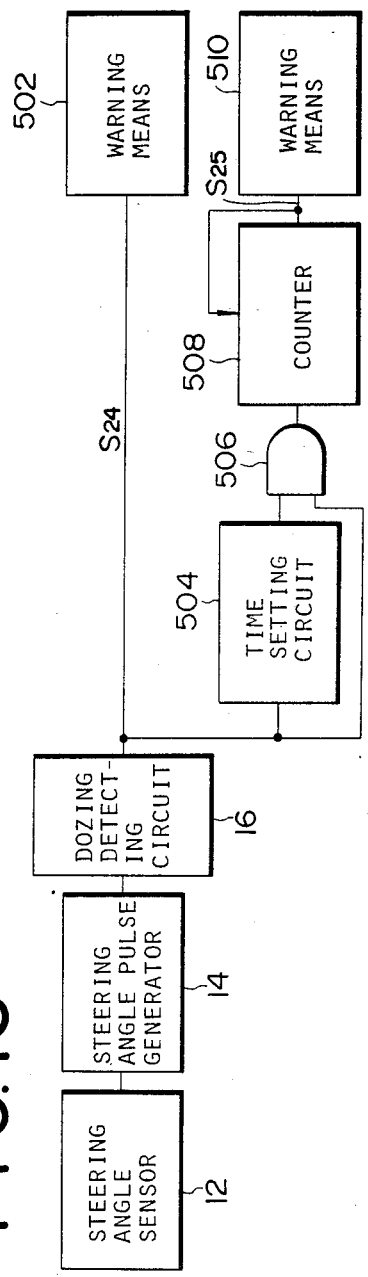
FIG. 16 is a block diagram of a fourth embodiment of the warning device of the present invention.

FIG. 16 shows the fourth embodiment of the present invention. The fourth embodiment comprises a first warning section 502 which receives the warning signal $S_{24}$ directly, a time setting circuit 504 to be turned on for a predetermined time period in response to the warning signal $S_{24}$, an AND gate 506 permitting the warning signal $S_{24}$ to pass therethrough only when the time setting circuit 504 is in the ON condition, a counter 508 for counting the pulses from the AND gate 506 to produce a second warning signal $S_{25}$ and resetting the counter value thereof when the counter value reaches a predetermined value and a second warning section 510 responsive to the second warning signal $S_{25}$ to produce a warning, in addition to the construction of the foregoing first embodiment. The first warning section 502 gives warning via a visible display, lighting a lamp or the like as a gentle warning. When the dozing detecting circuit 16 sequentially and continuously produces the warning signal S25, the second warning section 510 produces a rather strong warning such as a buzzer, a warning voice, discharging cold air or the like.

As described hereinabove, according to the present invention, when variation of the steering angle position from a certain standard steering angle continues in the same direction at a rate exceeding a predetermined frequency, indication is given that the vehicle is being steered through a curve in order to inhibit counting of the steering frequency. If the steering operations in alternating directions exceed the predetermined frequency, the warning is produced. This ensures detection of drowsiness of the driver and thus can effectively prevent the driver from falling asleep.

We claim:

1. A doze warning system for an automotive vehicle comprising:
    a steering angle detecting means for producing steering angle pulses at every predetermined angular variation of the steering, said steering angle pulses providing an indication of direction of the steering angle variation;
    a dozing detecting circuit including
    a first reset circuit means for counting up the steering angle pulses produced by the steering operation in the same direction and producing a curve signal when the counted value within a predetermined first period of time, measured from a time point of receiving the first steering angle pulse, reaches a first value;
    a second reset circuit means for producing a pulse interval signal when an interval between occurrences of the steering angle pulses is longer than a predetermined second period of time;
    a counter section means for counting said steering angle pulses and for producing a warning signal when a count of the steering angle pulses within the predetermined first period, reaches a second value, said counter section means resetting the count in response to said curve signal or said pulse interval signal; and
    a warning section for producing a warning when the warning signal is inputted.

2. A system as set forth in claim 1, wherein said counter section includes means for latching the warning signal for a given period of time and outputting the warning signal when the curve signal is not inputted within said given period of time.

3. A doze warning system for an automotive vehicle comprising:
    a steering angle detecting means for detecting steering angle and direction and producing detector signals representative of a given magnitude of steering angular variation and steering direction;
    doze detecting circuit means responsive to said detector signals to count the detector signal to produce a warning signal when the counter value reaches a given first value, said doze detecting circuit means clearing the counted value when the number of sequentially inputted detector signals indicative of steering in a single direction reaches a first predetermined value or when an interval between the detector signal is longer than a given first period;
    a warning device responsive to the warning signal to produce a warning;
    said doze detecting circuit means comprising a timer means responsive to the detector signals from said steering angle detecting means to start measurement of said given first period and for producing an output when said given first period expires, and a counter means for counting up said detector signals for the steering angle detecting means,
    wherein said counter means is connected to be cleared by
    said timer means output,
    by a first circuit having further counter means to count up detector signals representing steering operations in one or the other steering directions, said further counter means connected to be cleared in response to the timer means output and in response to a detector signal indicative of an opposite direction of steering operation and to produce a first reset signal when the count of consecutive detector signals indicative of a steering operation in a single direction reaches said first predetermined value, and
    by a second circuit which measures intervals between the detector signals to produce a second reset signal when an interval exceeds a second time period.

4. A doze warning system for an automotive vehicle comprising:
    a steering angle detecting means for detecting increasing or decreasing variation of steering angle from a predetermined standard position and producing detector signals indicative of steering direction everytime the steering angle variation exceeds a predetermined angle;
    a doze detector circuit including a warning signal generating means for counting up the detector signals and producing a warning signal when the counted value within a first predetermined period of time reaches a threshold value, a first circuit means for counting up the detector signals indicative of steering angle variation in one direction and producing a first reset signal for clearing the counted value of the warning signal generating means when the count of said first circuit means reaches a given value and a second circuit means for producing a second reset signal for clearing the counted value of the warning signal generating means when the interval between detector signals is longer than a second predetermined period of time; and
    a warning device for producing a warning in response to the warning signal.

5. The system as set forth in claim 4, wherein said doze detector circuit further comprises a timer means responsive to the detector signals to start measurement of said first predetermined period of time and for producing an output when the first predetermined period of time expires, and a counter means provided in said warning signal generating means for counting up said detector signals and connected to be cleared by said timer means output.

6. The system as set forth in claim 5, wherein said counter means is connected to said first circuit means having further counter means, to count up the detector signals to produce said first reset signal when the counted value thereof exceeds said given value, said further counter means connected to be cleared in response to the timer means output and in response to detector signals indicative of the opposite direction of steering operation, said second circuit means connected for measuring the intervals between said detector signals to provide said second reset signal when the interval exceeds the second predetermined period of time, and the counter means in said warning signal generating means connected to be cleared by either of said first or second reset signals.

7. The system as set forth in claim 6, wherein said counter means is connected to said warning device via delay circuit means to input said warning signal to the warning device after a delay time expires and to cancel the warning signal when a reset signal provided as a function of said first and second reset signals is inputted within the delay time.

8. The system as set forth in claim 6, which further comprises a vehicle speed sensor detecting a vehicle speed and producing an output when the detected vehicle speed is higher than a predetermined speed, and gates for inputting the detector signals to the doze detecting circuit when an AND condition of the detector signals and the vehicle speed sensor output is established.

9. The system as set forth in claim 6, wherein said warning device further comprises a first warning device directly connected with the doze detecting circuit to respond immediately to the warning signal to produce a first warning and a second warning device connected to the doze detecting circuit via a delay circuit to produce a second warning after expiration of a preset delay time.

10. A method for producing a warning for a vehicle driver dozing at the wheel, comprising the steps of:

detecting steering angle variation and steering direction whenever the rate of angular variation of steering is higher than a predetermined rate, producing steering angle signals at every predetermined angle of steering variation, said steering signals indicative of steering variation and direction when the rate of variation exceeds the predetermined rate, so that the interval between occurrences of said steering angle signals is shorter than a first given period of time;

counting occurrences of the steering angle signals to provide a first count, said producing step comprising the step of clearing said first count whenever an interval between occurrences of the steering angle signals becomes longer than said first period of time;

producing a warning signal when the first count reaches a given first value within a second given period of time which is longer than said first period of time;

counting occurrences of the steering angle signals while the steering is continuously operated in one direction to produce a second count;

producing a reset signal for resetting the counted first number when the counted second number of continuous one direction of steering signals representing a continuous steering operation in one direction reaches a given second value which is smaller than said first value; and producing the warning in response to the warning signal.

11. The method as set forth in claim 10, comprising the further step of providing a delay time between occurrence of the warning signal and occurrence of the warning and cancelling the warning when the reset signal occurs before expiration of the delay time.

12. The method as set forth in claim 11, comprising the further step of disabling production of the warning signal whenever the vehicle speed is lower than a given speed.

13. The method as set forth in claim 12 wherein the step of producing the warning comprises the steps of producing a first warning in response to said warning signal and providing a given lag time thereafter, producing a second warning in response to said warning signal with the given lag time, and cancelling said second warning when the reset signal is produced before expiration of said given lag time.

14. The method as set forth in claim 10, comprising the further step of disabling production of the warning signal whenever the vehicle speed is lower than a given speed.

15. The method as set forth in claim 10 wherein the step of producing the warning comprises the steps of producing a first warning in response to said warning signal and providing a given lag time thereafter, producing a second warning in response to said warning signal with the given lag time, and cancelling said second warning when the reset signal is produced before expiration of said given lag time.

* * * * *